(12) United States Patent
Nichols et al.

(10) Patent No.: US 8,181,057 B2
(45) Date of Patent: May 15, 2012

(54) TIME SYNCHRONIZATION IN UNITS AT DIFFERENT LOCATIONS

(75) Inventors: Edward Nichols, Berkeley, CA (US); Yuji Hosoda, Berkeley, CA (US); Thor Johnsen, Dublin, CA (US); Vamsi Vytla, El Cerrito, CA (US); Hong Zhang, El Sobrante, CA (US); Luis DePavia, Orinda, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 639 days.

(21) Appl. No.: 12/360,167

(22) Filed: Jan. 27, 2009

(65) Prior Publication Data

US 2009/0217074 A1   Aug. 27, 2009

Related U.S. Application Data

(60) Provisional application No. 61/030,694, filed on Feb. 22, 2008.

(51) Int. Cl.
*G06F 1/12* (2006.01)
*G01V 1/00* (2006.01)
*G01V 3/00* (2006.01)
*G04C 13/00* (2006.01)

(52) U.S. Cl. ......... 713/401; 340/853.1; 367/76; 368/46; 375/107

(58) Field of Classification Search .......... 713/401; 375/107; 367/76; 368/46; 340/853.1
See application file for complete search history.

(56) References Cited

U.S. PATENT DOCUMENTS

| | | | |
|---|---|---|---|
| 5,201,061 A * | 4/1993 | Goldberg et al. | 455/503 |
| 6,119,016 A * | 9/2000 | Matusevich | 455/502 |
| 6,400,646 B1 * | 6/2002 | Shah et al. | 367/82 |
| 6,859,831 B1 | 2/2005 | Gelvin et al. | |
| 6,912,465 B2 * | 6/2005 | Collins et al. | 702/6 |
| 6,930,958 B2 * | 8/2005 | Goergen | 368/10 |
| 7,142,129 B2 * | 11/2006 | Hall et al. | 340/853.3 |
| 7,263,036 B2 * | 8/2007 | Shirakawa | 368/46 |
| 7,583,560 B2 * | 9/2009 | Chamberlain et al. | 367/76 |
| 2001/0039478 A1 | 11/2001 | Bary et al. | |
| 2004/0105341 A1 | 6/2004 | Chamberlain et al. | |
| 2004/0117118 A1 | 6/2004 | Collins et al. | |
| 2006/0155758 A1 | 7/2006 | Arnegaard et al. | |
| 2009/0268758 A1 * | 10/2009 | Zhang | 370/503 |

FOREIGN PATENT DOCUMENTS

GB   2348023   9/2000

OTHER PUBLICATIONS

Berns, H.G. et al., GPS Time Synchronization System for K2K, Department of Physics, University of Washington, Seattle, WA.

* cited by examiner

*Primary Examiner* — Paul R Myers
*Assistant Examiner* — Christopher A Daley
(74) *Attorney, Agent, or Firm* — Jeremy Berman; Darla P. Fonseca; Charlotte Rutherford (57) ABSTRACT

To synchronize units of a formation evaluation/drilling operation evaluation system, a time delay associated with a communications link between a master unit and a slave unit of the formation evaluation/drilling operation evaluation system is determined. The master unit has a master time clock that provides universal time. The time delay associated with the communications link is used to enable synchronization of time provided by a slave time clock in the slave unit to the universal time.

23 Claims, 5 Drawing Sheets

TIME SYNCHRONIZATION IN UNITS AT DIFFERENT LOCATIONS

TECHNICAL FIELD

The invention relates generally to time synchronization in units at different locations.

BACKGROUND

Various different types of hydrocarbon exploration systems can be used to determine whether a subterranean structure includes a reservoir that contains hydrocarbons. One type of hydrocarbon exploration system is a cross-well exploration system that includes a first tool having a survey source provided in a first well, and a second tool having a survey receiver (or array of survey receivers) provided in a second well. With this cross-well arrangement, the survey source in the first well is activated to transmit signals that are propagated through a subterranean structure between the first and second wells for receipt by the survey receiver (or array of survey receivers) in the second well.

Another type of hydrocarbon exploration system is a surface exploration system in which survey sources and receivers are placed on or above a surface over the subterranean structure of interest. Signals from the survey sources are propagated into the subterranean structure, with subterranean elements (including any reservoirs that may be present) reflecting signals back up to the surface for detection by the survey receivers.

Examples of survey sources and receivers include seismic sources and receivers or electromagnetic (EM) sources and receivers.

An issue associated with hydrocarbon exploration systems is synchronization of different tool components that may be spaced apart by relatively large distances. In many cases, it may be desirable to synchronize events occurring in multiple tool components placed in different locations. Some conventional systems relied upon a surface free-running reference clock and a cable connection from the reference clock to a remote tool component, where a reference clock signal is transmitted through the cable to the remote tool component. This approach made the assumption that the propagation delay through the cable between the reference clock and the remote tool component remains constant, regardless of temperature, pressure, or mechanical changes. Any change in the cable delay (drift) can introduce an unknown error in the measurement. In fact, over long distances, the delay over the cable can be quite large (e.g., tens of microseconds). Such a conventional approach does not enable accurate synchronization of events occurring at multiple tools. In addition, the repeatability between time-lapsed surveys made with a conventional technique relies on using the same cable or cable with equivalent delay each time a survey is made, which is impractical in field operations.

SUMMARY

In general, according to an embodiment, a method of synchronizing units of a system (e.g., subterranean survey system, downhole production system, downhole exploration system, etc.) includes determining a time delay associated with a communications link between a master unit and a slave unit of the system. The master unit has a master time clock that provides universal time. Measurement and compensation for the time delay associated with the communications link is used to enable synchronization of time provided by a slave time clock in the slave unit to the universal time.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
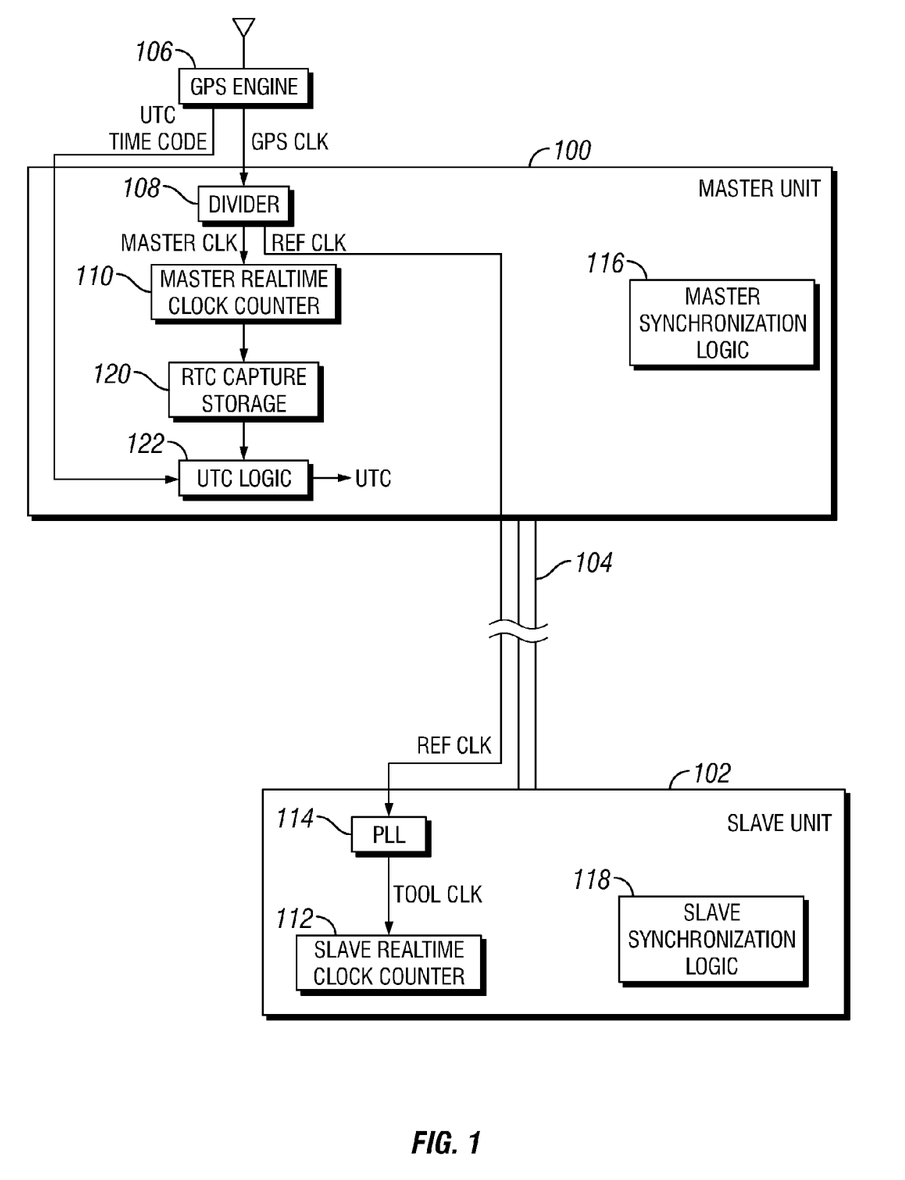
FIG. 1 is a block diagram of an arrangement that includes a master unit and a slave unit, where each of the master and slave units is associated with a realtime clock counter, and the realtime clock counters are synchronized with respect to each other, in accordance with an embodiment.

FIG. 1 illustrates an example arrangement that includes a master unit 100 and a slave unit 102 that are both part of a "formation evaluation/drilling operation evaluation system," which refers to any one of: a subterranean survey system (e.g., seismic surface survey system, electromagnetic or EM surface survey system, cross-well, surface-to-borehole, or borehole-to-surface seismic or EM survey system, etc.), a downhole system (e.g., a logging tool in which the master unit is located at the earth surface and the slave unit is located in a wellbore), a downhole production system (e.g., a system to produce hydrocarbons), downhole drilling system (e.g., a logging-while-drilling or LWD system), or any other type of system related to performing tasks in a well and/or with respect to a subterranean reservoir. In a more specific example, in a seismic survey system, the master unit can be a controller, and the slave unit can be a seismic receiver (or seismic receiver array). As another example, in a controlled source EM survey system, the master unit can be a controller, while the slave unit can be a transmitter towed in deep water.

The master unit 100 and slave unit 102 can be separated by relatively large distances. For example, the master unit 100 can be part of a surface system at a well, while the slave unit 102 can be located deep downhole (e.g., greater than 10,000 feet deep). Alternatively, both the master unit and slave unit can be located at or above the earth surface, with the master unit separated by large distances from the slave unit.

A communications link 104 is provided between the master unit 100 and slave unit 102. The communications link 104 can be implemented with an electrical cable in some implementations. The electrical cable can be part of a wireline, can extend through a tubing, or can be part of a wired pipe or tubing (in which wires are embedded in the wall of the pipe or tubing). In other implementations, the communications link 104 can be a wireless link, such as an acoustic link, a pressure pulse link, an electromagnetic (EM) communications link, and so forth.

The master unit 100 is associated with a GPS (global positioning system) engine 106, which is in communication with GPS satellites. A GPS satellite has an atomic clock, and the GPS satellite continually transmits messages containing the current time and a one-pulse-per-second (1PPS) clock (in some implementations). From the GPS time, the GPS engine 106 can calculate the UTC (coordinated universal time), which is output by the GPS engine 106 as a UTC time code. The GPS engine 106 also provides a disciplined clock (GPS CLK) signal to a clock divider 108, which divides the GPS CLK signal to a master clock (MASTER CLK) signal. The MASTER CLK signal is the clock input to a master realtime clock counter 110.

A reference clock (REF CLK) signal can also be output by the divider 108. Note that REF CLK can be the same as MASTER CLK in some implementations.

The REF CLK signal is communicated over the communications link 104 to the slave unit 102, such that the slave unit 102 can be run off of a reference clock that is derived from the GPS CLK signal. This ensures that the slave unit 102 has a realtime clock counter 112 (referred to as a "slave realtime clock counter") that runs at the same frequency as the master realtime clock counter 110 in the master unit 100. In a system where there are multiple slave units 102, the REF CLK signal is provided to each of the other slave units such that slave realtime clock counters in the other slave units can also be run off of the same frequency as the master realtime clock counter 110.

In a wired arrangement, the REF CLK signal can be provided over an electrical wire in the communications link 104. In a wireless arrangement, the REF CLK signal can be provided in a carrier frequency.

As depicted in FIG. 1, the slave unit 102 includes a phase locked loop (PLL) circuit 114, which generates a tool clock (TOOL CLK) signal that has a fixed relation to the phase of the REF CLK signal. The TOOL CLK signal is the clock input to the slave realtime clock counter 112 of the slave unit 102. The continuous (or continual) provision of the REF CLK signal and the use of the PLL circuit 114 in the slave unit 102 allows for the system to retain absolute frequency matching between the master and slave units. Note that use of the PLL circuit 114 allows the REF CLK signal to have a lower frequency for those implementations where the communications link has limited bandwidth.

As further depicted in FIG. 1, the master unit 100 includes master synchronization logic 116, and the slave unit 102 includes slave synchronization logic 118. Note that the synchronization logic 116, 118 can be implemented with hardware or software. If implemented with software, the respective synchronization logic 116 or 118 is executable on a processor.

The master synchronization logic 116 is configured to send synchronization packets over the communications link 104 to the slave synchronization logic 118. The slave synchronization logic 118 is configured to respond to the synchronization packets sent by the master synchronization logic 116 by sending response synchronization packets back up the communications link 104 to the master synchronization logic 116. The exchange of synchronization packets enables the master synchronization logic 116 to determine a two-way delay over the communications link 104, where the two-way delay includes the downlink delay from the master unit 100 to the slave unit 102, plus the delay from the slave unit 102 to the master unit 100. This two-way delay, as determined by the master synchronization logic 116, can be used to estimate a one-way delay over the communications link 104. The one-way delay is then used to determine a time offset associated with the one-way delay over the communications link 104, where the time offset is used to enable synchronization of the realtime clock counter 112 in the slave unit 102 with a universal time (UTC) provided by the master unit 100.

"Universal time" is based on time that is according to a high-precision standard, such as atomic time from GPS satellites, for example.

The master unit 100 also has an RTC capture storage 120 to capture the output of the master realtime clock counter 110. The output of the RTC capture storage 120 is provided to UTC logic 122 in the master unit 100. The UTC logic 122 also receives the UTC time code from the GPS engine 106. The UTC logic 122 is able to associate the UTC time code with a value of the master realtime clock counter 110. Based on this association of the UTC time code to the value of the master realtime clock counter 110, the UTC logic 122 is able to output a UTC based on the master realtime clock counter 110. Effectively, the UTC logic 122 determines an offset between the master realtime clock counter 110 and the UTC time code provided by the GPS engine 106. This offset is continually adjusted to account for drift of the master realtime clock counter 110 from the UTC time. Once the offset is known, the UTC logic 122 can readily determine the UTC from the current count of the master realtime clock counter 110. The combination of the master realtime clock counter 110 and the UTC logic 122 provides one embodiment of a master time clock that is able to provide universal time.

To characterize the two-way delay of the communications link 104, the master synchronization logic 116 sends a synchronization packet that leaves the master unit 100 at time Tdd. The synchronization packet sent by the master synchronization logic 116 is referred to as a downlink (DL) synchronization packet. A timing diagram depicted in FIG. 2 illustrates the various times involved in communications of synchronization packets.

Figure 2:
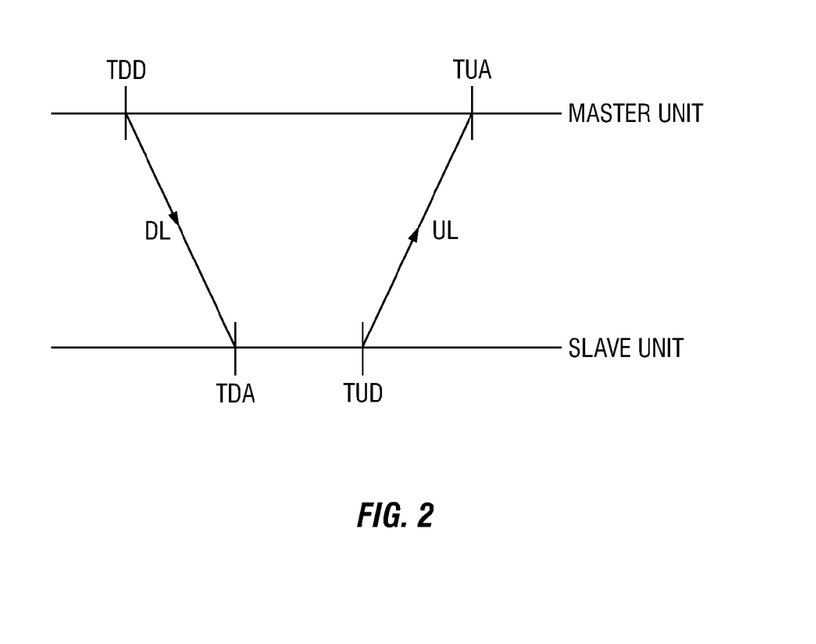
FIG. 2 is timing diagram illustrating relative timings of a packet sent between the master unit and the slave unit.

As depicted in FIG. 2, the DL synchronization packet is sent at time Tdd by the master unit 100, and arrives at the slave unit 102 at time Tda. In response to the DL synchronization packet, the slave synchronization logic 118 sends an uplink (UL) synchronization packet, where the UL synchronization packet is sent by the slave unit 102 at time Tud. The UL synchronization packet is received by the master unit 100 at time Tua.

Figure 3:
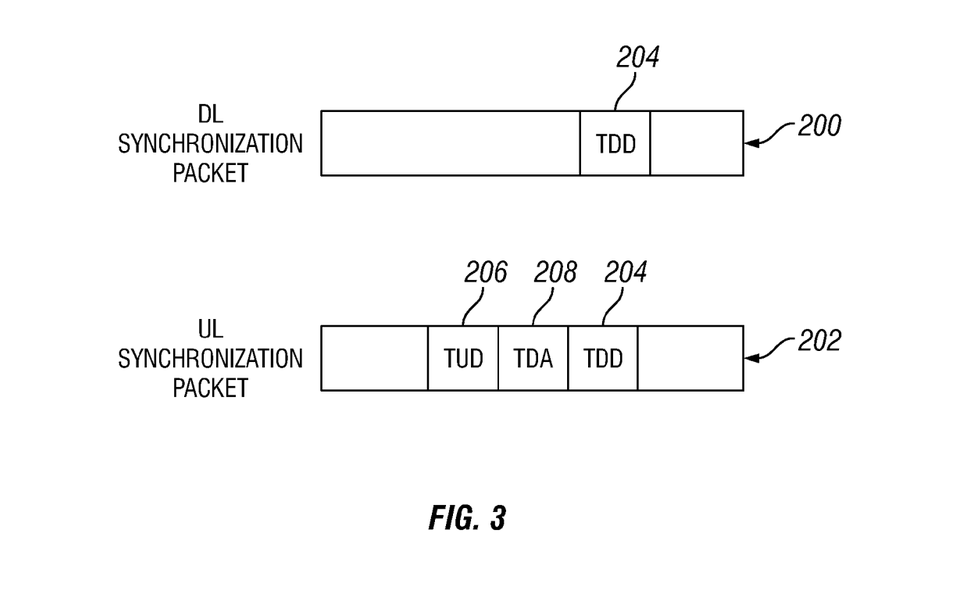
FIG. 3 illustrates downlink and uplink synchronization packets containing various times that are used for performing synchronization according to an embodiment.

As further depicted in FIG. 3, a DL synchronization packet 200 and a UL synchronization packet 202 are depicted, where the DL synchronization packet includes a field 204 that contains the Tdd value (time that the DL synchronization packet 200 left the master unit 100).

The UL synchronization packet 202 also includes the field 204 that contains the Tdd value, along with a field 206 that contains Tud, and a field 208 that contains Tda.

Based on these four time points, the one-way communications link delay, CD, is computed as:

$$CD=[(Tua-Tdd)-(Tud-Tda)]/2. \qquad \text{(Eq. 1)}$$

Note that the one-way cable delay is based on an average of the roundtrip (two-way) delay, which is (Tua−Tdd)−(Tud−Tda).

Next, a time offset between the master realtime clock counter 110 and the slave realtime clock counter 112, OFFSET$_{M,S}$ is computed as follows:

$$OFFSET_{M,S}=Tua-Tua-CD. \qquad \text{(Eq. 2)}$$

Note that the computation of CD and $\text{OFFSET}_{M,S}$ is performed by the master synchronization logic 116. Once $\text{OFFSET}_{M,S}$ is computed, the master unit 100 is able to estimate a value of the slave realtime clock counter 112 in reference to the current count of the master realtime clock counter 110.

Once CD is known, a length of the communications link 104 can be determined in some implementations. The determination of the communications link length takes into account temperature effects on electronics, and temperature and pressure effects on cables.

When the master unit 100 wishes to trigger a downhole event in the slave unit 102, the master unit 102 can send a DL command over the communications link 104 to the slave unit 102 to generate the trigger in a near future time point calculated based on the slave realtime clock counter 112. The DL command contains an event time that is equal to the target time as kept by the master realtime clock counter 110, plus $\text{OFFSET}_{M,S}$. Upon receiving this DL command to perform the specified event, the slave unit 102 will perform the action at the specified near future time point (event time).

In this manner, the slave realtime clock counter 112 provides a time value that is synchronized to the UTC, or more specifically in the implementation of FIG. 1, to a time provided by the GPS engine 106.

Although the above refers to the master unit 100 compensating for $\text{OFFSET}_{M,S}$ in a DL command sent to the slave unit 102, note that the compensation can instead be performed by the slave unit 102. In this latter approach, the slave unit 102 would be provided with the $\text{OFFSET}_{M,S}$ value, and would be able to convert a time in the DL command to local time of the slave unit 102 based on $\text{OFFSET}_{M,S}$.

The communications link delay information can be used to compensate for any drifts in the delay of the communications link 104 due to changing conditions, such as temperature, pressure, or mechanical changes (e.g., length of cable changing). The PLL circuit 114 in the slave unit 102 allows the slave unit 102 to keep its own local time, where this local time is synchronized with respect to the time maintained by the master unit 100. In accordance with some embodiments, an absolute accuracy of sub-microsecond precision at an update rate of 50 milliseconds can be maintained. Using long term averaging of the measurements, for example 1,000 times, the system can even be able to provide sub-ten nanoseconds accuracy. Averaging refers to making multiple measurements of the cable delay and taking an average of these multiple delays. Such averaging is part of a "stacking" procedure in which multiple measurements are stacked (by averaging) to improve accuracy.

The master realtime clock counter 110 is an accurate disciplined clock that is synchronized to universal time (e.g., GPS time), which enables the master unit 100 to operate synchronously with other remote stations (other master units) that may also use GPS. As a result, no cables would have to be used between stations that use GPS. Moreover, using techniques according to some embodiments, synchronization can be maintained between a slave unit (or multiple slave units) and the master unit 100.

Figure 4:
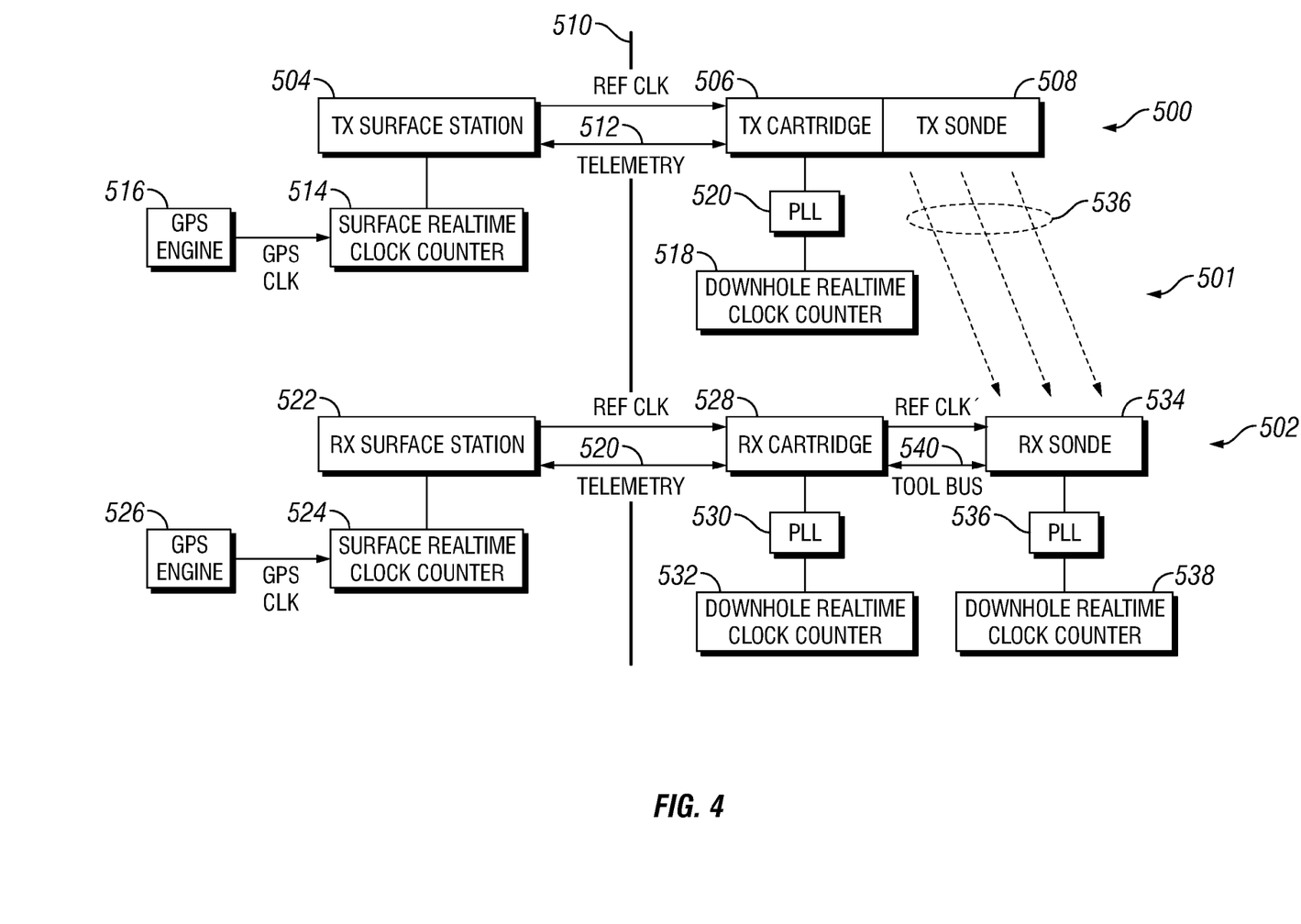
FIG. 4 is a block diagram of an example arrangement for performing cross-well surveying in which a synchronization mechanism according to an embodiment is incorporated.

FIG. 4 shows an example arrangement for performing cross-well surveying of a subterranean structure. A transmitter tool is provided in a first well (designated generally as 500), and a receiver tool is provided in a second well (referenced generally as 502). The transmitter tool includes a transmitter surface station 504, a downhole transmitter cartridge 506, and a transmitter sonde 508. The transmitter sonde 508 is used to transmit signals (536) through the subterranean structure (represented generally as 501) between the first and second wellbores 500, 502. A gray line 510 depicts an earth surface.

Figure 5:
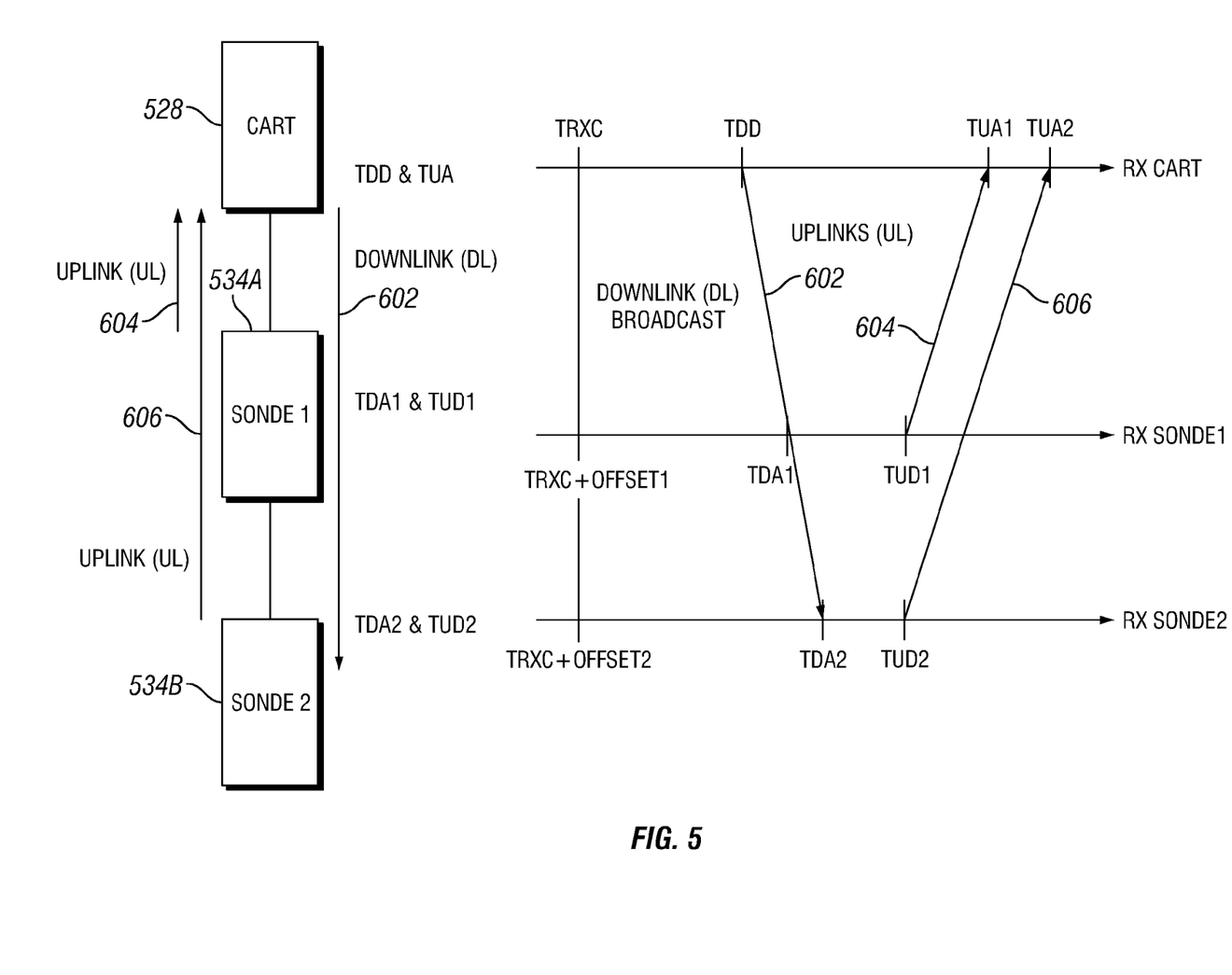
FIG. 5 illustrates exchanges of synchronization packets between a downhole cartridge and multiple sondes, according to an embodiment.

Telemetry 512 is provided over a communications link between the transmitter surface station 504 and the downhole transmitter cartridge 506. Note also that a reference clock (REF CLK) signal is provided from the transmitter surface station 504 to the transmitter downhole cartridge 506. In the example of FIG. 5, the transmitter surface station 504 would be part of the master unit 100 depicted in FIG. 1, while the transmitter downhole cartridge 506 would be part of the slave unit 102 depicted in FIG. 1.

A surface realtime clock counter 514 is associated with the transmitter surface station 504. The surface realtime clock counter 514 receives a GPS CLK signal from a GPS engine 516.

A downhole realtime clock counter 518 is associated with the transmitter downhole cartridge 506, and the clock input to the downhole realtime clock counter 518 receives a clock signal provided by a PLL circuit 520 that receives the REF CLK signal from the transmitter surface station 504.

The surface realtime clock counter 514 and GPS engine 516 correspond to the master realtime clock counter 110 and GPS engine 106, respectively, of FIG. 1. The downhole realtime clock counter 518 and PLL circuit 520 correspond to the slave realtime clock counter 112 and PLL circuit 114, respectively, of FIG. 1.

The receiver tool includes similar elements, including a receiver surface station 522, and a surface realtime clock counter 524 associated with the receiver surface station 522. The surface realtime clock counter 524 receives the GPS CLK signal from a GPS engine 526. Telemetry 528 is provided over a communications link between receiver surface station 522 and a receiver downhole cartridge 528. Also, the receiver surface station 522 sends a REF CLK signal to the receiver downhole cartridge 528.

A PLL circuit 530 and a downhole realtime clock counter 532 are associated with the receiver downhole cartridge 528. The surface realtime clock counter 524 and GPS engine 526 correspond to the master realtime clock counter 110 and GPS engine 106, respectively, of FIG. 1. The PLL circuit 530 and downhole realtime clock counter 532 correspond to the PLL circuit 114 and slave realtime clock counter 112, respectively, of FIG. 1.

The receiver tool further includes a receiver sonde (or multiple receiver sondes) 534, which receive(s) survey signals (536) such as EM signals or seismic signals, from the transmitter sonde 508. A PLL circuit 536 and sonde realtime clock counter 538 are associated with the receiver sonde 534. The receiver cartridge 528 sends a REF CLK' signal to the receiver sonde 534. The PLL circuit 536 generates an output clock to the sonde realtime clock counter 538, where the output clock from the PLL circuit 536 has a fixed relation to the phase of the REF CLK' signal. The REF CLK' signal is generated from the REF CLK signal received by the receiver downhole cartridge 528 from the receiver surface station 522.

A tool bus 540 enables communication between the receiver downhole cartridge 528 and the receiver sonde 534. Note that there may be multiple receiver sondes (not shown) in the receiver tool. Note that there may also be a mix of receivers and transmitters.

Synchronization is also performed between the receiver downhole cartridge 528 and the one or more receiver sondes. FIG. 5 shows an arrangement that includes two receiver sondes 534A and 534B coupled to the receiver downhole cartridge 528. To perform the synchronization between the receiver downhole cartridge 528 and the sondes 534A, 534B, a corresponding communications link delay between the receiver downhole cartridge 528 and each of the sondes 534A, 534B is measured. The receiver downhole cartridge 528 broadcasts (602) a DL synchronization packet over the tool bus 540 (FIG. 4) to the sondes 534A, 534B. The DL synchronization packet is sent at time Tdd, which is depicted in the timing diagram on the right side of FIG. 5. The DL synchronization packet is received by the first sonde 534A at time Tda1, and received by the second sonde 534B at time Tda2.

A UL response synchronization packet is sent (at 604) from the first sonde 534A to the receiver cartridge 528. The UL response synchronization packet is sent from the first sonde 534A at time Tud1.

The second sonde 534B also sends (at 606) a UL response synchronization packet to the receiver cartridge 528. The UL response synchronization packet is sent at time Tud2, and is received by the receiver cartridge 528 at time Tua2.

The UL synchronization packets sent by the sondes 534A and 534B are similar to the UL synchronization packet depicted in FIG. 3, and include fields containing the following times: Tdd, Tud1 or Tud2, and Tda1 or Tda2.

Based on the various times contained in the UL synchronization packets, the communications link delay between the receiver downhole cartridge 528 and each of the sondes 534A, 534B can be computed in a manner similar to Eq. 1 above. Also, a time offset between the receiver downhole cartridge 528 and each of the sondes 534A, and 534B can be computed in a similar way as in Eq. 2. As depicted in the timing diagram of FIG. 5, the offset between the receiver downhole cartridge 528 and the first sonde 534A is OFFSET1, and the offset between the receiver cartridge 528 and the second sonde 534B is OFFSET2.

Using the time offsets between the receiver cartridge 528 and the corresponding sondes 534A, 534B, the receiver downhole cartridge 528 can schedule an event to occur at each respective sonde at a specified near future time, taking into account the corresponding offsets. In this manner, the time kept by each sonde realtime clock counter is synchronized to the times in the receiver cartridge 528. In turn, the time in the receiver cartridge 528 is synchronized to the UTC of the receiver surface station 522.

In some implementations, the offsets between the receiver downhole cartridge 528 and each of the receiver sondes can be communicated to the surface station (522) for processing by the surface station. In alternative implementations, the offsets between the receiver downhole cartridge 528 and the receiver sondes 534 can be kept in the receiver downhole cartridge 528, with the receiver downhole cartridge 528 adjusting event times in commands sent to each receiver sonde.

By using the various time offsets described above, translation can be performed between GPS time (UTC) and a time either at the receiver downhole cartridge 528 or at a receiver sonde 534.

Note that between the receiver downhole cartridge 528 and each receiver sonde 534, the receiver downhole cartridge 528 can be considered as part of the master unit 100 of FIG. 1, while each receiver sonde 534 can be considered as part of the slave unit 102 of FIG. 1. The difference would be that the receiver downhole cartridge 528, as the master unit 100, would receive the REF CLK signal instead of a GPS CLK signal.

Figure 6:
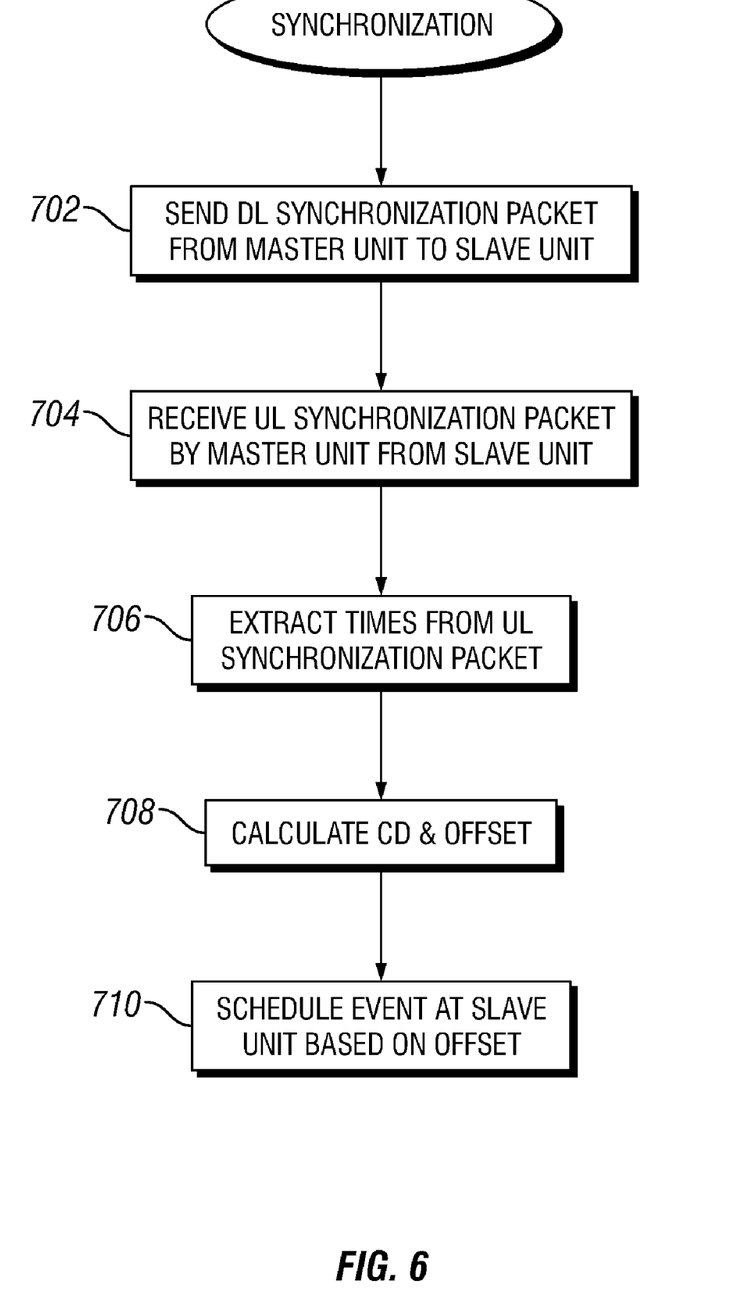
FIG. 6 is a flow diagram of a synchronization process according to some embodiments.

FIG. 6 shows a synchronization procedure according to an embodiment. The synchronization procedure is performed at a master unit, such as master unit 100 in FIG. 1, transmitter surface station 504 or receiver surface station 522 in FIG. 5, or receiver downhole cartridge 528 in its role as master with respect to a receiver sonde.

The synchronization procedure can be performed by a master synchronization logic, such as master synchronization logic 116 in FIG. 1. The master synchronization logic sends (at 702) a DL synchronization packet from the master unit to the slave unit. As noted above, this DL synchronization packet contains a Tdd value to indicate the time at which the DL synchronization packet was sent by the master unit.

At some later point in time, a UL response synchronization packet is received (at 704) by the master unit from the slave unit. The UL response synchronization packet contains additional time fields, including Tud and Tda.

The times in the various time fields of the received UL response synchronization packet are extracted (at 706), and the communications link delay and offset values are calculated (at 708) according to Eqs. 1 and 2. Based on the offset, an event can be scheduled at a slave unit according to the local time of the slave unit, which is synchronized time at the master unit.

Once an event is triggered at a slave unit, the slave unit can continue to perform tasks are associated with the event without further intervention from the master unit. For example, if the event corresponds to an acquisition task for acquiring data, then the acquisition can continue until all data within a cycle or pass has been collected.

In one specific example of a seismic survey system, the slave unit can be part of a seismic receiver. In a seismic survey system, a check shot is often sent by a seismic source to a seismic receiver to determine if, and when, the seismic receiver receives the check shot. Since time at the seismic receiver is synchronized to time of a master unit according to some embodiments, the time at which the seismic receiver receives the check shot can be expressed in universal time.

Instructions of software described above (including the synchronization logic 116 or 118 of FIG. 1) are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of synchronizing units of a formation evaluation/drilling operation evaluation system, comprising:
    determining a time delay associated with a communications link between a master unit and a slave unit of the formation evaluation/drilling operation evaluation system, wherein the master unit has a master time clock that provides universal time; and using the time delay associated with the communications link to enable synchronization of time provided by a slave time clock in the slave unit to the universal time;

wherein the master unit and slave unit are part of a transmitter tool in a cross-well survey system, the method further comprising:

providing a receiver tool in the cross-well survey system, wherein the receiver tool has a second master unit and a second slave unit;

determining a time delay associated with a second communications link between the second master unit and the second slave unit, wherein the second master unit has a second master time clock that provides universal time; and using the time delay associated with the second communications link to enable synchronization of time provided by a second slave time clock in the second slave unit to the universal time provided by the second master time clock.

2. The method of claim 1, further comprising receiving, by the master time clock, a universal time code from a universal time source.

3. The method of claim 2, wherein receiving the universal time code from the universal time source comprises receiving the universal time code from a global positioning system (GPS) engine.

4. The method of claim 1, wherein determining the time delay comprises:

sending, by the master unit, a first synchronization packet over the communications link to the slave unit; and receiving, by the master unit, a response synchronization packet from the slave unit, wherein the response synchronization packet includes time fields containing a first time at which the first synchronization packet is sent by the master unit, a second time at which the first synchronization packet is received by the slave unit, and a third time at which the response synchronization packet is sent by the slave unit.

5. The method of claim 4, wherein determining the time delay further comprises:

extracting the first, second, and third times from the response synchronization packet; and computing the time delay based on the first, second, and third times as well as based on a fourth time at which the response synchronization packet is received by the master unit.

6. The method of claim 5, further comprising:

computing a time offset based on the time delay and the third and fourth times.

7. The method of claim 1, further comprising:

deriving, by the master unit, a reference clock signal from a clock signal provided by a global positioning system (GPS) source; and sending, by the master unit, the reference clock signal to the slave unit.

8. The method of claim 7, further comprising:

generating, by a phase locked loop circuit in the slave unit, a slave clock signal based on the reference clock signal.

9. The method of claim 8, wherein the reference clock signal is continually provided to the phase locked loop circuit in the slave unit to allow for frequency matching between the master and slave units.

10. The method of claim 8, further comprising:

clocking, using the slave clock signal, a slave realtime clock counter in the slave time clock; and clocking, using a clock signal derived from the GPS source, a master realtime clock counter in the master time clock.

11. The method of claim 1, further comprising:

each of the master units receiving input from a corresponding global positioning system (GPS) source.

12. The method of claim 1, wherein the receiver tool further comprises at least one receiver sonde coupled to the second slave unit by a tool bus, the method further comprising:

synchronizing time of the at least one receiver sonde with time of the second slave time clock in the second slave unit.

13. The method of claim 1, further comprising:

continually refining the time delay to account for drift of the time delay due to changing conditions.

14. The method of claim 1, wherein determining the time delay comprises:

averaging multiple time delay measurements to enhance accuracy.

15. The method of claim 1, further comprising:

determining a length of the communications link based on the time delay and accounting for temperature effects.

16. The method of claim 1, wherein the slave unit is part of a seismic receiver, the method further comprising:

determining a universal time at which a an event such as a check shot is received by the seismic receiver.

17. The method of claim 1, wherein the formation evaluation/drilling operation evaluation system further includes at least one other slave unit, the method further comprising:

synchronizing time of the at least one other slave unit with the universal time of the master unit.

18. The method of claim 1, wherein synchronizing units of the formation evaluation/drilling operation evaluation system comprises synchronizing units of one or more of the following: a seismic survey system, an electromagnetic survey system, a downhole logging system, a downhole production system, and a downhole drilling system.

19. A system comprising:

a tool to perform an operation in a well or with respect to a subterranean structure, wherein the tool comprises:

a master unit having a master time clock to provide universal time;

a slave unit having a slave time clock;

a communications link connecting the master unit and the slave unit;

synchronization logic to determine a time delay of the communications link, wherein the time delay enables a time provided by the slave time clock to be synchronized to the universal time;

wherein the master unit and slave unit are part of a transmitter tool in a cross-well survey system, the method further comprising:

providing a receiver tool in the cross-well survey system, wherein the receiver tool has a second master unit and a second slave unit;

determining a time delay associated with a second communications link between the second master unit and the second slave unit, wherein the second master unit has a second master time clock that provides universal time; and using the time delay associated with the second communications link to enable synchronization of time provided by a second slave time clock in the second slave unit to the universal time provided by the second master time clock.

20. The system of claim 19, wherein the master time clock includes a master realtime clock counter that is clocked by a clock signal derived from a global positioning system (GPS) source, and wherein the slave time clock includes a slave realtime clock counter that is clocked by a reference clock signal derived from the GPS source.

21. The system of claim 20, wherein the master unit is configured to transmit the reference clock signal to the slave unit over the communications link.

22. The system of claim 21, wherein the reference clock signal is provided in a carrier frequency of the communications link.

23. The system of claim 19, wherein the communications link is one of a wired link and wireless link.

* * * * *